(12) United States Patent
Wen et al.

(10) Patent No.: US 8,726,230 B1
(45) Date of Patent: May 13, 2014

(54) GENERATING A USER INTERFACE FOR SENDING DATA AMONG RESOURCES

(75) Inventors: Jianjun Wen, San Jose, CA (US); Xinyu Tang, Cupertino, CA (US)

(73) Assignee: Google Inc., Mountain View, CA (US)

( * ) Notice: Subject to any disclaimer, the term of this patent is extended or adjusted under 35 U.S.C. 154(b) by 420 days.

(21) Appl. No.: 13/267,924

(22) Filed: Oct. 7, 2011

(51) Int. Cl.
*G06F 9/44* (2006.01)
*G06F 3/00* (2006.01)
*G06F 3/048* (2013.01)

(52) U.S. Cl.
CPC .. *G06F 8/38* (2013.01); *G06F 3/048* (2013.01)
USPC ............................ 717/109; 717/106; 715/762

(58) Field of Classification Search
CPC ............... G06F 8/30; G06F 8/34; G06F 8/38; G06F 3/048
USPC ........... 717/106–109, 168–173; 715/762, 763
See application file for complete search history.

(56) References Cited

U.S. PATENT DOCUMENTS

| 7,287,230 | B2 * | 10/2007 | Austin et al. | 715/763 |
| 7,624,375 | B2 * | 11/2009 | Santori et al. | 717/121 |
| 7,844,911 | B2 * | 11/2010 | Austin et al. | 715/763 |
| 2002/0070968 | A1 * | 6/2002 | Austin et al. | 345/764 |
| 2004/0255269 | A1 * | 12/2004 | Santori et al. | 717/109 |
| 2005/0066280 | A1 * | 3/2005 | Austin et al. | 715/733 |
| 2009/0138273 | A1 | 5/2009 | Leung | |

* cited by examiner

*Primary Examiner* — Qing Chen
(74) *Attorney, Agent, or Firm* — Fish & Richardson P.C.

(57) ABSTRACT

A method performed by one or more processing devices includes receiving a request to generate a computer program; generating, in response to receiving the request, a first user interface that when rendered on a display device renders: one or more first visual representations of one or more first fields of the first resource; and one or more second visual representations of one or more second fields of the second resource; receiving, through the first user interface, a selection of: at least one of the one or more first visual representations; and at least one of the one or more second visual representations; receiving, through a second user interface, data specifying the one or more operations; and updating, based on the received data, the computer program with one or more third instructions to perform the one or more operations.

17 Claims, 7 Drawing Sheets

GENERATING A USER INTERFACE FOR SENDING DATA AMONG RESOURCES

TECHNICAL FIELD

This disclosure relates generally to generating a user interface for sending data among resources.

BACKGROUND

A developer can write a computer program to collect data from one resource and to store data in another resource. Generally, a resource includes a an item of data, including, e.g., a data structure, a personal profile page, a video file, an image file, an audio file, a web page, a form, a form in a web page, a book article, and a news article. Generally, a data structure includes a pre-defined format for organizing and/or for storing data.

In an example, the developer writes the computer program to collect data from a web page and to store the data in a data structure. Following the data being stored in the data structure, the developer wants to retrieve the data to re-display the data in the web page. In this example, the developer writes an additional computer program to retrieve the data from the data structure and to re-display the data in the web page.

SUMMARY

In one aspect of the present disclosure, a method performed by one or more processing devices includes receiving a request to generate a computer program that reads data from a first resource, performs one or more operations on the read data, and writes data resulting from performance of the one or more operations to a second resource; generating, in response to receiving the request, a first user interface that when rendered on a display device renders: one or more first visual representations of one or more first fields of the first resource; and one or more second visual representations of one or more second fields of the second resource; receiving, through the first user interface, a selection of: at least one of the one or more first visual representations; and at least one of the one or more second visual representations; determining, based on the selection of the one or more first visual representations, at least one of the one or more first fields of the first resource from which data is read; determining, based on the selection of the one or more second visual representations, at least one of the one or more second fields of the second resource to which the data is written; generating the computer program including: one or more first instructions to read the data from the at least one of the one or more first fields; and one or more second instructions to write the data resulting from the performance of the one or more operations to the at least one of the one or more second fields; generating a second user interface that when rendered on the display device renders: a third visual representation of the computer program, with a portion of the third visual representation for input of the one or more operations; receiving, through the second user interface, data specifying the one or more operations; and updating, based on the received data, the computer program with one or more third instructions to perform the one or more operations.

Implementations of the disclosure can include one or more of the following features. In some implementations, the method also includes accessing, in response to the request, the first resource and the second resource. In other implementations, the method includes transmitting, to a computing device that sent the selection, the second user interface. In still other implementations, the method includes accessing a mapping of visual representations to fields of resources; wherein determining the at least one of the one or more first fields of the first resource includes: determining, in the mapping, one or more correspondences among the at least one of the one or more first visual representations and the at least one of the one or more first fields; wherein determining the at least one of the one or more second fields of the second resource includes: determining, in the mapping, one or more correspondences among the at least one of the one or more second visual representations and the at least one of the one or more second fields.

In some implementations, the method includes reading the data from the at least one of the one or more first fields; performing the one or more operations on the data read from the at least one of the one or more first fields; and writing the data resulting from the performance of the one or more operations to the at least one of the one or more second fields. In other implementations, one or more of the first resource and the second resource includes one or more of a data structure, a web page, a form, and a web site.

In some implementations, the first user interface includes a same user interface as the second user interface. In other implementations, the first resource includes a same resource as the second resource.

In still another aspect of the disclosure, one or more machine-readable media are configured to store instructions that are executable by one or more processing devices to perform operations including receiving a request to generate a computer program that reads data from a first resource, performs one or more operations on the read data, and writes data resulting from performance of the one or more operations to a second resource; generating, in response to receiving the request, a first user interface that when rendered on a display device renders: one or more first visual representations of one or more first fields of the first resource; and one or more second visual representations of one or more second fields of the second resource; receiving, through the first user interface, a selection of: at least one of the one or more first visual representations; and at least one of the one or more second visual representations; determining, based on the selection of the one or more first visual representations, at least one of the one or more first fields of the first resource from which data is read; determining, based on the selection of the one or more second visual representations, at least one of the one or more second fields of the second resource to which the data is written; generating the computer program including: one or more first instructions to read the data from the at least one of the one or more first fields; and one or more second instructions to write the data resulting from the performance of the one or more operations to the at least one of the one or more second fields; generating a second user interface that when rendered on the display device renders: a third visual representation of the computer program, with a portion of the third visual representation for input of the one or more operations; receiving, through the second user interface, data specifying the one or more operations; and updating, based on the received data, the computer program with one or more third instructions to perform the one or more operations. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving a request to generate a computer program that reads data from a first resource, performs one or more operations on the read data, and writes data resulting from performance of the one or more operations to a second resource; generating, in response to receiving the request, a first user interface that when rendered on a display device renders: one or more first visual representations of one or more first fields of the first resource; and one or more second visual representations of one or more second fields of the second resource; receiving, through the first user interface, a selection of: at least one of the one or more first visual representations; and at least one of the one or more second visual representations; determining, based on the selection of the one or more first visual representations, at least one of the one or more first fields of the first resource from which data is read; determining, based on the selection of the one or more second visual representations, at least one of the one or more second fields of the second resource to which the data is written; generating the computer program including: one or more first instructions to read the data from the at least one of the one or more first fields; and one or more second instructions to write the data resulting from the performance of the one or more operations to the at least one of the one or more second fields; generating a second user interface that when rendered on the display device renders: a third visual representation of the computer program, with a portion of the third visual representation for input of the one or more operations; receiving, through the second user interface, data specifying the one or more operations; and updating, based on the received data, the computer program with one or more third instructions to perform the one or more operations. Implementations of this aspect of the present disclosure can include one or more of the foregoing features.

In yet another aspect of the disclosure, an electronic system includes means for receiving a request to generate a computer program that reads data from a first resource, performs one or more operations on the read data, and writes data resulting from performance of the one or more operations to a second resource; means for generating, in response to receiving the request, a first user interface that when rendered on a display device renders: one or more first visual representations of one or more first fields of the first resource; and one or more second visual representations of one or more second fields of the second resource; means for receiving, through the first user interface, a selection of: at least one of the one or more first visual representations; and at least one of the one or more second visual representations; means for determining, based on the selection of the one or more first visual representations, at least one of the one or more first fields of the first resource from which data is read; means for determining, based on the selection of the one or more second visual representations, at least one of the one or more second fields of the second resource to which the data is written; means for generating the computer program including: one or more first instructions to read the data from the at least one of the one or more first fields; and one or more second instructions to write the data resulting from the performance of the one or more operations to the at least one of the one or more second fields; means for generating a second user interface that when rendered on the display device renders: a third visual representation of the computer program, with a portion of the third visual representation for input of the one or more operations; means for receiving, through the second user interface, data specifying the one or more operations; and means for updating, based on the received data, the computer program with one or more third instructions to perform the one or more operations. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF DRAWINGS

Like reference symbols and designations in the various drawings indicate like elements.

DETAILED DESCRIPTION

A system consistent with this disclosure generates a user interface for sending data among resources. In an example, the sending of data among resources may include reading data from a resource, performing operations on the data, and writing data resulting from performance of the operations to another resource. Generally, an operation includes an action resulting from an instruction. For example, types of operations include additive operations, multiplicative operations, subtractive operations, operations that perform various mathematical formulas, operations to format data, and the like.

In an example, a user of the system uses the user interface to specify fields in web page from which the system reads data. Generally, a field can include an element of a resource for storage and/or for input of data. Through the user interface, the user also inputs data specifying operations to be performed on the data read from the web page. In this example, the user also uses the user interface to specify fields in a data structure to which the system writes data resulting from performance of the operations.

In an example, the system can be configured to read data from and/or to write data to numerous types of data structures, including, e.g., protocol buffers, arrays, lists, binary trees, hashes, graphs, and the like. A protocol buffer includes a data structure that stores data according to a serialization format. Generally, a serialization format includes a definition of how to convert data from an original format into a compressed format for storage. The data stored in the protocol buffer can be restored to its original format by reversely applying the serialization format to decompress the data.

Figure 1A:
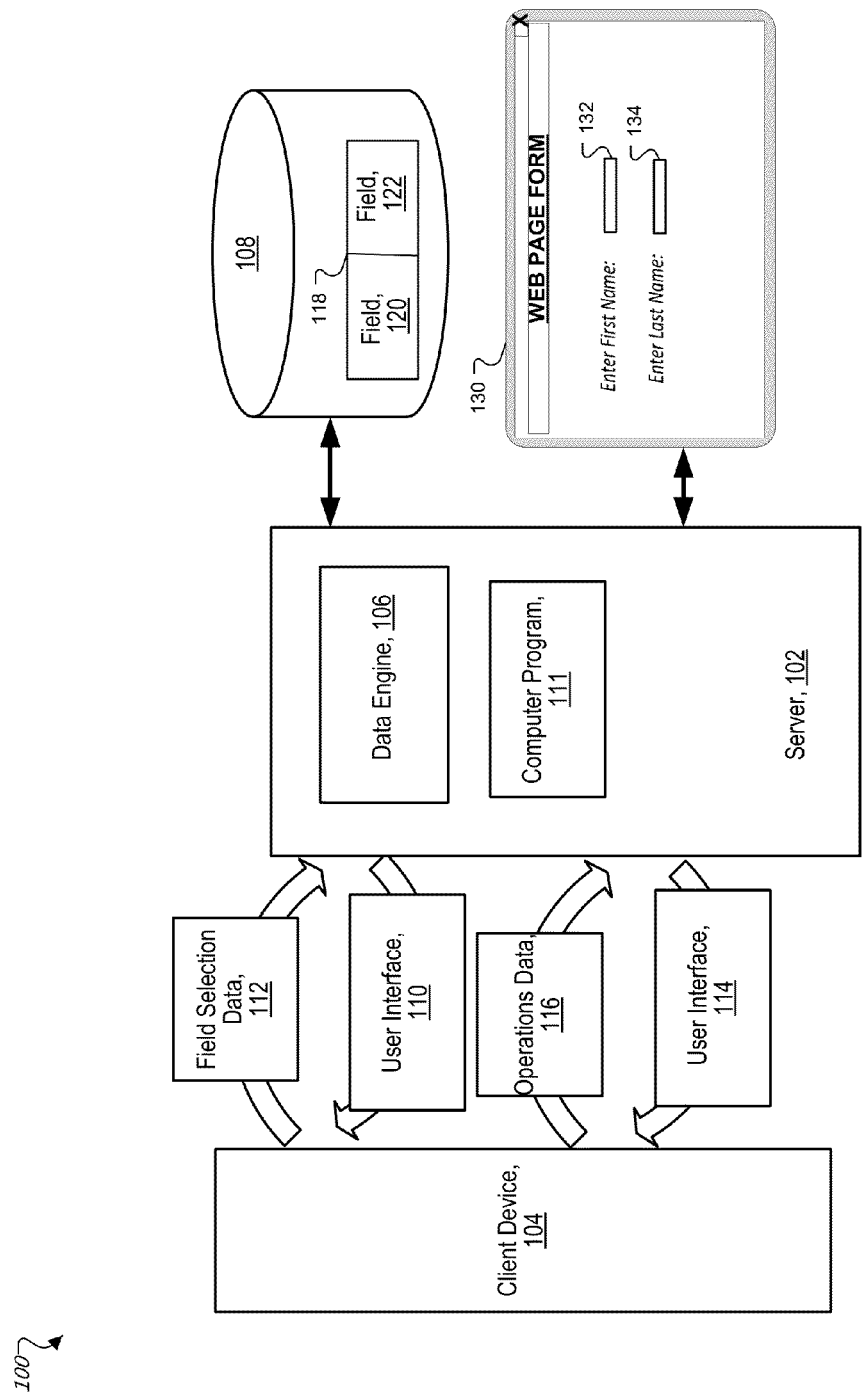
FIG. 1A is a conceptual diagram of an example of a system for generating user interfaces for sending data among resources.

FIG. 1A is a conceptual diagram of an example of system 100 for generating user interfaces 110, 114 for sending data among resources, including, e.g., resources 118, 130.

System 100 includes server 102. Server 102 includes data engine 106 for generating computer program 111 for reading and for writing data among resources 118, 130. System 100 also includes client device 104, e.g., for the viewing of user interfaces 110, 114. System 100 also includes data repository 108. In the example of FIG. 1, data repository 108 stores resource 118. In this example, resource 130 may be hosted by a device (not shown) that is external to system 100 and/or by a device (not shown) that is internal to system 100.

In the example of FIG. 1, resource 118 includes fields 120, 122. In this example, resource 118 includes a data structure. Resource 130 includes fields 132, 134. In this example, resource 130 includes a form in a web page. In an example, field 132 is for entry of first name data, e.g., data specifying a first name of a viewer of resource 130. Field 134 is for entry of last name data, e.g., data specifying a last name of the viewer of resource 130. In this example, data engine 106 may read the first and the last name data from fields 132, 134 and may write the first and the last name data to fields 120, 122, respectively.

In another example, data engine 106 may read the first and the last name data from fields 120, 122. Data engine 106 may also write the first and the last name data to fields 132, 134, respectively.

In an example, data engine 106 generates user interface 110. User interface 110 is described in further detail with regard to FIG. 1B. Through user interface 110, a user may select one or more of fields 120, 122, 132, 134 as input fields to computer program 111. Generally, an input field includes a field from which data engine 106 reads data to input into computer program 111. Through user interface 110, a user may also select one or more of fields 120, 122, 132, 134 as output fields to computer program 111. Generally, an output field includes a field to which data engine 106 writes data that is output from computer program 111.

In an example, a user of client device 104 inputs into user interface 110 field selection data 112, including, e.g., data specifying a selection in user interface 110 of input fields and/or output fields. In the example of FIG. 1, field selection data 112 specifies that fields 120, 122 of resource 118 are input fields. Field selection data 112 also specifies that fields 132, 134 of resource 130 are output fields.

Client device 104 sends field selection data 112 to server 102. Using field selection data 112, data engine 106 identifies the input fields for computer program 111. In accordance with the input fields, data engine 106 generates input instructions. Generally, input instructions include instructions to read data from the input fields and to input the data into computer program 111.

Using field selection data 112, data engine 106 also identifies the output fields for computer program 111. In accordance with the output fields, data engine 106 generates output instructions. Generally, output instructions include instructions to write data that is output from computer program 111 to the output fields. Data engine 106 inserts the output and the input instructions into computer program 111.

Figure 1B:
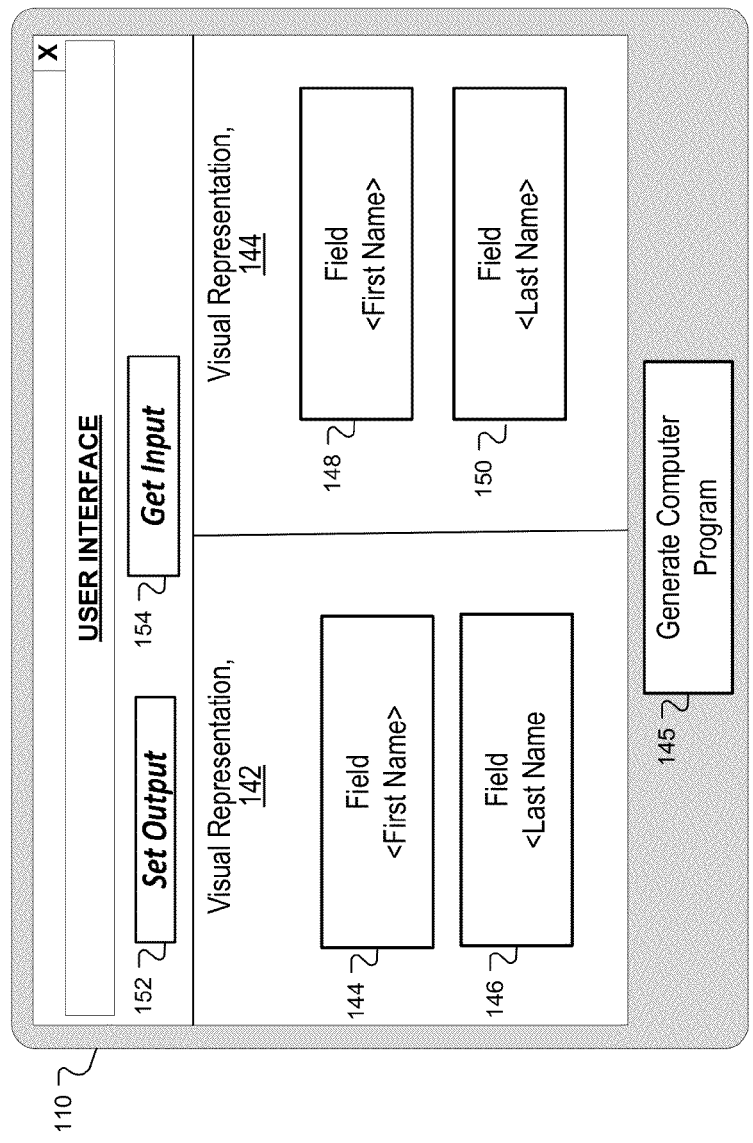
FIG. 1B is an example of a user interface for sending data among resources.
Figure 1C:
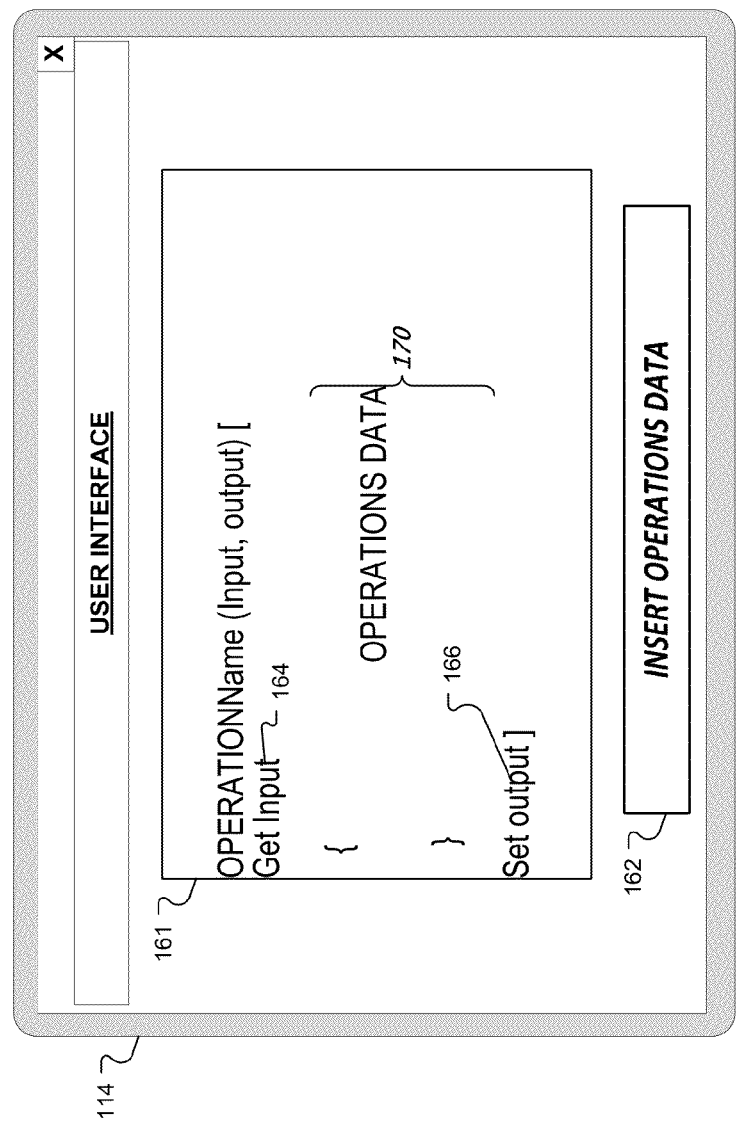
FIG. 1C is an example of a user interface for specifying contents of a computer program for sending data among resources.

Data engine 106 also generates user interface 114, which is described in further detail with regard to FIG. 1C. A user of client device 104 inputs operation instructions 116 into user interface 114. Generally, operation instructions 116 include instructions to perform various operations on data read from input fields.

Through user interface 114, client device 104 sends operation instructions 116 to server 102. Data engine 106 inserts operation instructions 116 into computer program 111. In an example, operation instructions 116 include instructions to format data in accordance with a format supported by the output fields. In the example of FIG. 1, data engine 106 executes computer program 111, reads data from the input fields (e.g., fields 120, 122), formats the data to be written to the output fields (e.g., fields 132, 134), and writes the data to the output fields (e.g., fields 132, 134).

FIG. 1B is an example of user interface 110 for sending data among resources 118, 130. User interface 110 includes side-by-side visual representations 142, 144 of resources 118, 130 (FIG. 1), respectively. Visual representation 142 of resource 118 includes visual representations 144, 146 of fields 120, 122 of resource 118. Visual representation 144 of resource 130 includes visual representations 148, 150 of fields 132, 134 of resource 130.

In an example, user interface 110 also includes elements 152, 154. Through selection of element 154, the user of client device 104 may specify input fields. In this example, a user selects element 154 and selects one or more of visual representations 144, 146, 148, 150. Client device 104 sends to server 102 field selection data 112, which includes data specifying selection of element 154 and the visual representations selected following selection of element 154. Using the selected visual representations, data engine 106 determines the input fields for computer program 111, e.g., by using the mapping indicated in the below Table 1.

TABLE 1

| Visual Representation | Field |
|---|---|
| 144 | 120 |
| 146 | 122 |
| 148 | 132 |
| 150 | 134 |

The above Table 1 includes a mapping of visual representations 144, 146, 148, 150 in user interface 110 to fields 120, 122, 132, 134 in resources 118, 130, respectively. Generally, a mapping includes a relationship among items of data. For example, visual representation 144 is mapped to field 120 to specify that data input into visual representation 144 is for field. In this example, if a user selects element 154 and visual representation 144, data engine 106 identifies field 120 as an input field, e.g., using the mapping between visual representation 144 and field 120. User interface 110 also includes element 152. Through element 152, the user of client device 104 may specify output fields for computer program 111.

In an example, a user specifies the output fields by selecting element 152 and also selecting one or more of visual representations 144, 146, 148, 150. In this example, following selection of element 152 and one or more of visual representations 144, 146, 148, 150, client device 104 sends to server 102 field selection data 112 specifying selection of element 152 and the selected visual representations. Using field selection data 112, data engine 106 determines output fields for computer program 111, for example, by using a mapping to determine which of fields 120, 122, 132, 134 correspond to the visual representations selected following selection of element 152.

In an example, user interface 110 also includes element 145. Selection of element 145 causes field selection data 112 to be sent to data engine 106, e.g., for use in computer program 111. In this example, selection of element 145 also causes data engine 106 to generate user interface 114 (FIG. 1C).

In another example, user interface 110 also includes another element (not shown) for selection of a programming language to be used for computer program 111. In this example, a user writes operation instructions 116 in the selected programming language.

FIG. 1C is an example of user interface 114 for specifying contents of computer program 111 for sending data among resources 118, 130. In the example of FIG. 1C, user interface 114 displays visual representation 161 of computer program 111. Visual representation 161 includes input instructions 164 and output instructions 166.

Visual representation 161 also includes portion 170 for insertion of operation instructions 116. In an example, a user of client device 104 inserts operation instructions 116 into portion 170 of visual representation 161.

User interface 114 also includes element 162, selection of which causes operation instructions 116 to be sent to server 102. In response, data engine 106 inserts operations instructions 116 into computer program 111.

In a variation of FIGS. 1B and 1C, user interfaces 110, 114 are displayed in a single user interface (not shown). In this example, contents of user interface 114 are updated in real-time, e.g., following selection of elements 145, 152, 154 and/or visual representations 144, 146, 148, 150.

Figure 2:
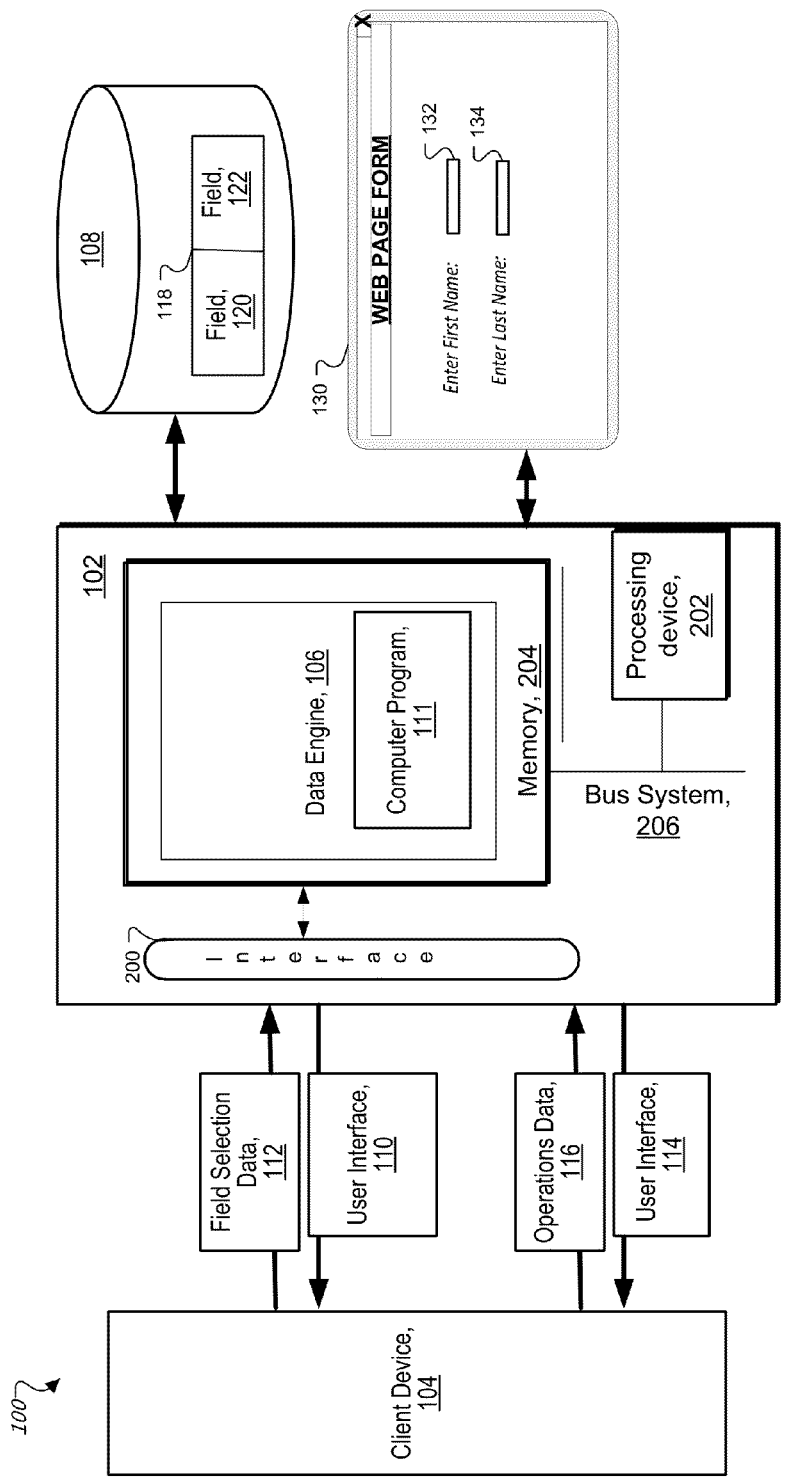
FIG. 2 is a block diagram showing examples of components of a system for generating user interfaces for sending data among resources.

FIG. 2 is a block of examples of components of system 100 for generating user interfaces 110, 114 for sending data among resources 118, 130.

Client device 104 can be any computing device capable of taking input from a user and communicating over a network (not shown) with server 102 and/or with other client devices. For example, client device 104 can be a mobile device, a desktop computer, a laptop, a cell phone, a personal digital assistant (PDA), a server, an embedded computing system, a mobile device, and the like. Although a single client device 104 is shown in FIGS. 1 and 2, system 100 can include a plurality of client devices, which can be geographically dispersed.

Server 102 can be any of a variety of computing devices capable of receiving data and running one or more services, which can be accessed by client device 104. In an example, server 102 can include a server, a distributed computing system, a desktop computer, a laptop, a cell phone, a rack-mounted server, and the like. Server 102 can be a single server or a group of servers that are at a same location or at different locations. Client device 104 and server 102 can run programs having a client-server relationship to each other. Although distinct modules are shown in the figures, in some examples, client and server programs can run on the same device.

Server 102 can receive data from client device 104 via input/output (I/O) interface 200. I/O interface 200 can be any type of interface capable of receiving data over a network, such as an Ethernet interface, a wireless networking interface, a fiber-optic networking interface, a modem, and the like. Server 102 also includes a processing device 202 and memory 204. A bus system 206, including, for example, a data bus and a motherboard, can be used to establish and to control data communication between the components of server 102.

Processing device 202 can include one or more microprocessors. Generally, processing device 202 can include any appropriate processor and/or logic that is capable of receiving and storing data, and of communicating over a network (not shown). Memory 204 can include a hard drive and a random access memory storage device, such as a dynamic random access memory, or other types of non-transitory machine-readable storage devices. As shown in FIG. 2, memory 204 stores computer programs that are executable by processing device 202. These computer programs include data engine 106 and computer program 111.

Data engine 106 can be implemented in software running on a computer device (e.g., server 102), hardware or a combination of software and hardware. Although data engine 106 is shown as a single module in FIGS. 1 and 2, data engine 106 can exist in one or more modules, which can be distributed and coupled by one or more networks (not shown.

Figure 3:
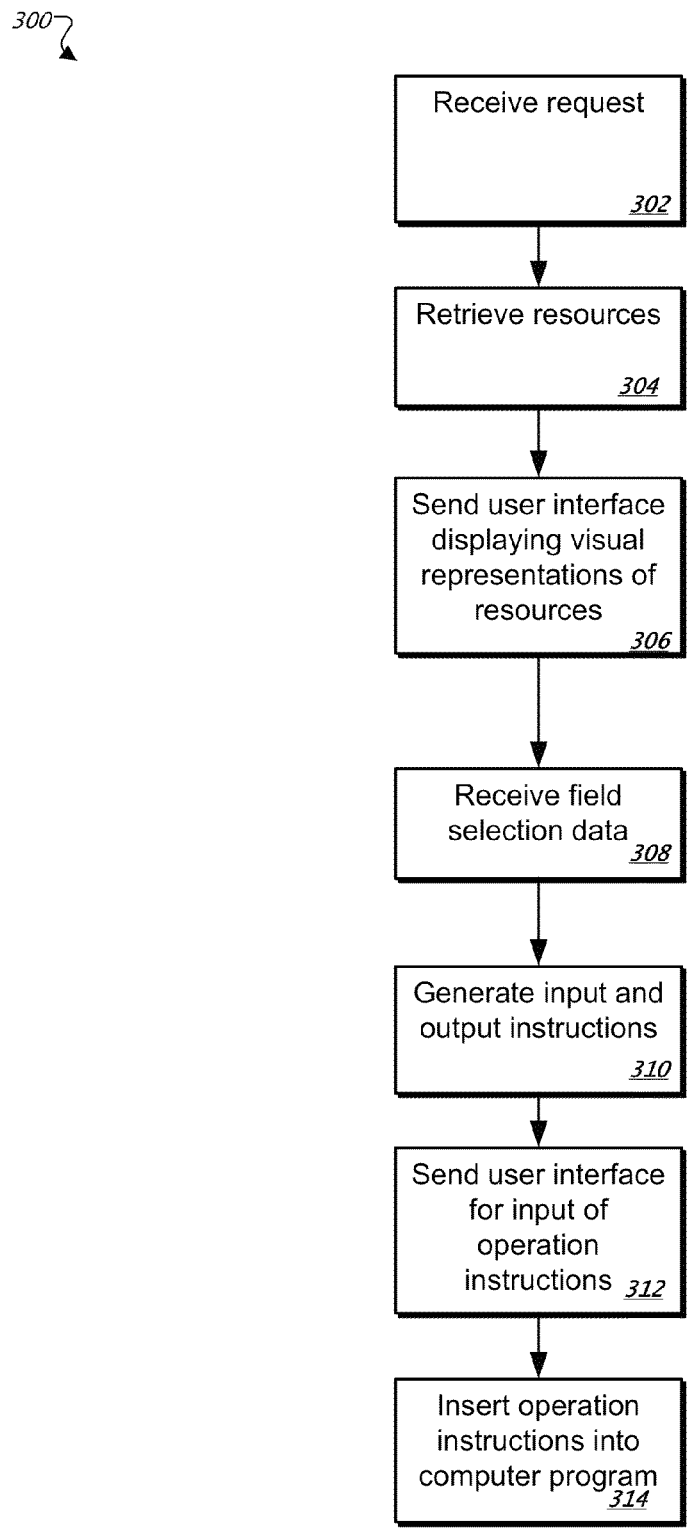
FIG. 3 is a flow chart of an example process for generating a computer program for sending data among resources.

FIG. 3 is a flow chart of an example process 300 for sending data among resources 118, 130. In operation, server 102 receives (302) a request (not shown) to generate computer program 111. In an example, the request is to generate a computer program (e.g., computer program 111) that reads data from a first resource (e.g., one of resources 118, 130), performs one or more operations on the read data, and writes data resulting from performance of the one or more operations to a second resource (e.g., one of resources 118, 130). That is, the request specifies the resources to be used in the reading and the writing of data. In an example, the request may specify which resource is used for reading data and which resource is used for writing data. In another example, the request may specify resources and a user may use elements 152, 154 in specifying which resource is used for reading data and which resource is used for writing data. In response, data engine 106 retrieves (304) resource 118 from data repository 108 and resource 130 from the device hosting resource 130.

Data engine 106 parses (not shown) contents of resources 118, 130. Using results of the parsing, data engine 106 identifies (not shown) fields 120, 122 in resource 118 and fields 132, 134 in resource 130. Data engine 106 generates (not shown) user interface 110 that displays visual representations 142, 144 of resources 118, 130. In an example, user interface 110 includes a template that displays visual representations 144, 146, 148, 150 of fields 120, 122, 132, 134. In this example, a user of client device 104 may edit the template to customize which of fields 120, 122, 132, 134 are visually represented in user interface 110, how fields 120, 122, 132, 134 are visually represented in user interface 110, a font type for text displayed in fields 120, 122, 132, 134, a color for text displayed in fields 120, 122, 132, 134, a view type for fields 120, 122, 132, 134, including, e.g., whether fields 120, 122, 132, 134 are displayed in a flat structure view, in a nested-tree view, and so forth.

Server 102 sends (306) user interface 110 to client device 104. As previously described, a user of client device 104 views user interface 110 and selects one or more of visual representations 144, 146, 148, 150 as input fields and output fields for computer program 111. Client device 104 sends (not shown) to server 102 field selection data 112. Field selection data 112 includes data indicative of the selected visual representations in user interface 110.

Server 102 receives (308) field selection data 112. In response, data engine 106 identifies input and output fields for computer program. Using the input and the output fields, data engine 106 generates (310) input instructions 164 (FIG. 1C) and output instructions 166. In an example, computer program 111 includes input instructions 164 and output instructions 166. In this example, data engine 106 generates computer program 111. Using computer program 111, data engine 106 generates user interface 114, including, e.g., a visual representation of user interface 114.

Data engine 106 also sends (312) user interface 114 to client device 104. As previously described, a user of client device 104 inputs operation instructions 116 into portion 170 of user interface 114. Server 102 receives (not shown) operation instructions 116. In this example, data engine 106 inserts (314) operation instructions 116 into computer program 111. In an example, data engine 106 inserts operation instructions 116 into computer program 111 by updating computer program 111 with operation instructions 116.

Figure 4:
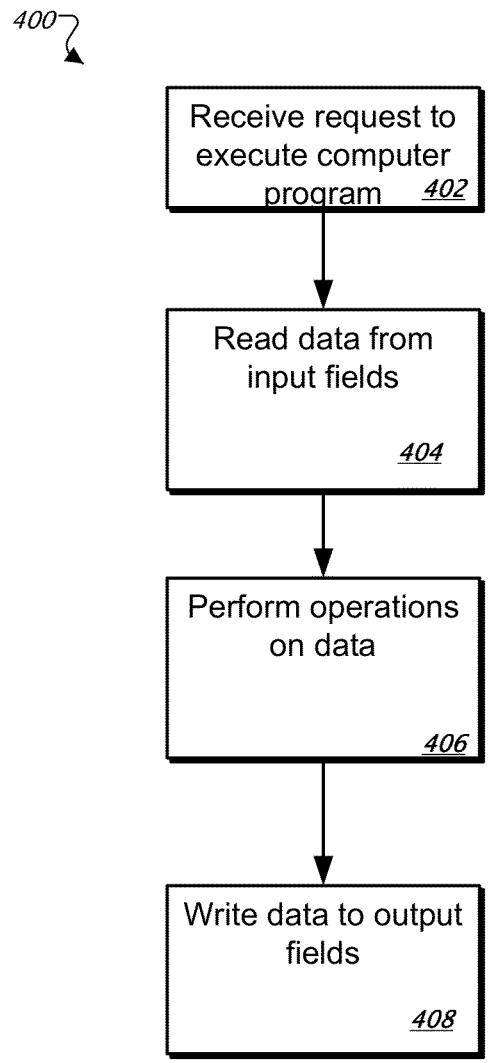
FIG. 4 is a flow chart of an example process for sending data among resources.

FIG. 4 is a flow chart of an example process 400 for sending data among resources 118, 130. In operation, data engine 106 receives (402) a request (not shown) to execute computer program 111. Based on execution of input instructions 164 in computer program 111, data engine 106 reads (404) data from the input fields. Using operation instructions 116 in computer program 111, data engine 106 performs (406) operations on the data. Based on execution of output instructions 166 in computer program 111, data engine 106 writes (408) data resulting from performance of the operations to the output fields.

Using the techniques described herein, a system sends data among resources. In an example, the system generates a user interface through which a user may specify fields of a resource from which the system reads data. Through another user interface, the user may specify various operations to be performed on the data. Additionally, through the user interface, the user may also specify fields of another resource to which the system writes data resulting from performance of the operations.

Figure 5:
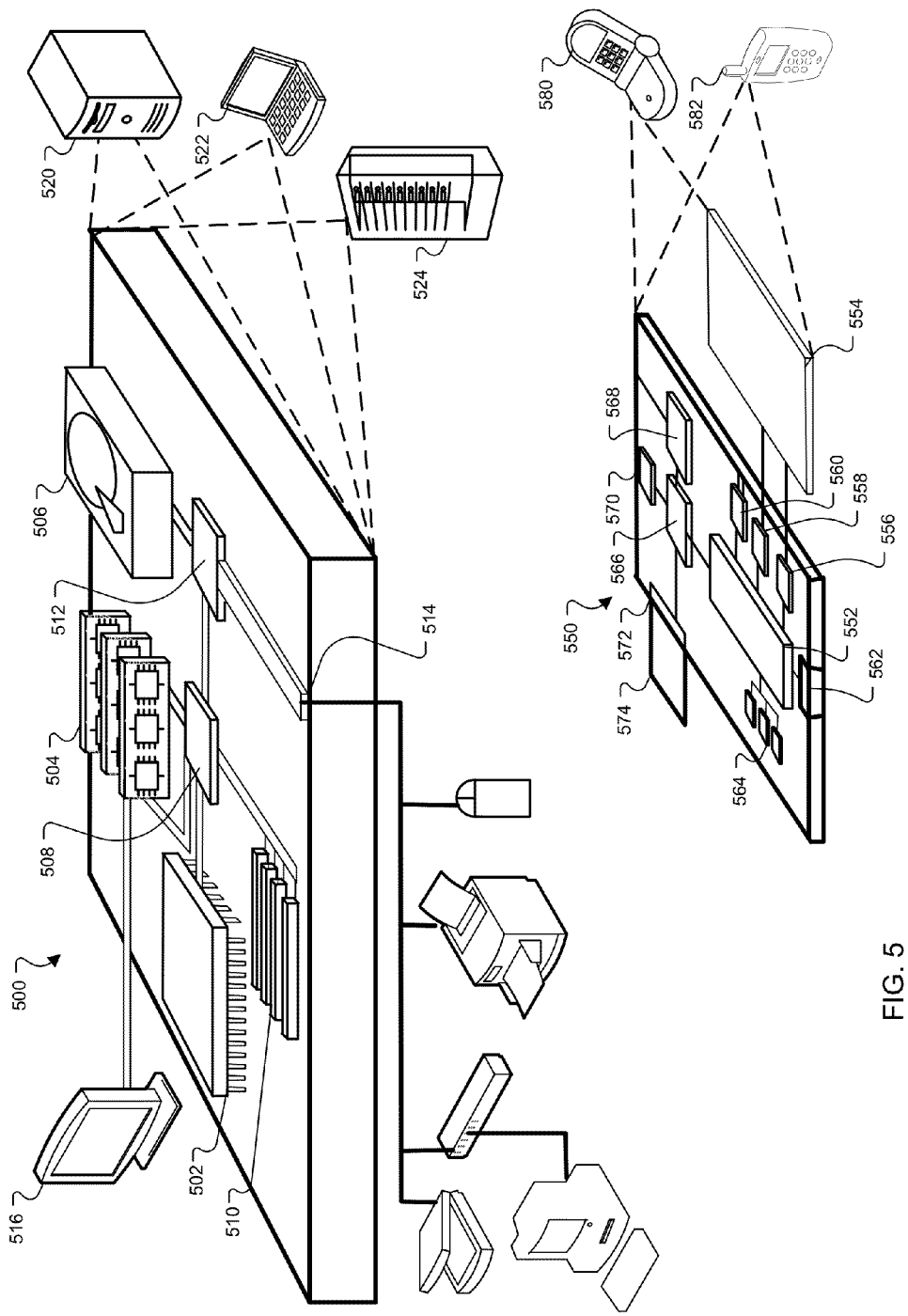
FIG. 5 shows an example of a computer device and a mobile computer device that can be used to implement the techniques described herein.

FIG. 5 shows an example of computer device 500 and mobile computer device 550, which can be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes processor 502, memory 504, storage device 506, high-speed interface 508 connecting to memory 504 and high-speed expansion ports 510, and low speed interface 512 connecting to low speed bus 514 and storage device 506. Each of components 502, 504, 506, 508, 510, and 512, are interconnected using various busses, and can be mounted on a common motherboard or in other manners as appropriate. Processor 502 can process instructions for execution within computing device 500, including instructions stored in memory 504 or on storage device 506 to display graphical data for a GUI on an external input/output device, such as display 516 coupled to high speed interface 508. In other implementations, multiple processors and/or multiple buses can be used, as appropriate, along with multiple memories and types of memory. Also, multiple computing devices 500 can be connected, with each device providing portions of the necessary operations (e.g., as a server bank, a group of blade servers, or a multi-processor system).

Memory 504 stores data within computing device 500. In one implementation, memory 504 is a volatile memory unit or units. In another implementation, memory 504 is a non-volatile memory unit or units. Memory 504 also can be another form of computer-readable medium, such as a magnetic or optical disk.

Storage device 506 is capable of providing mass storage for computing device 500. In one implementation, storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an data carrier. The computer program product also can contain instructions that, when executed, perform one or more methods, such as those described above. The data carrier is a computer- or machine-readable medium, such as memory 504, storage device 506, memory on processor 502, and the like.

High-speed controller 508 manages bandwidth-intensive operations for computing device 500, while low speed controller 512 manages lower bandwidth-intensive operations. Such allocation of functions is an example only. In one implementation, high-speed controller 508 is coupled to memory 504, display 516 (e.g., through a graphics processor or accelerator), and to high-speed expansion ports 510, which can accept various expansion cards (not shown). In the implementation, low-speed controller 512 is coupled to storage device 506 and low-speed expansion port 514. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 500 can be implemented in a number of different forms, as shown in the figure. For example, it can be implemented as standard server 520, or multiple times in a group of such servers. It also can be implemented as part of rack server system 524. In addition or as an alternative, it can be implemented in a personal computer such as laptop computer 522. In some examples, components from computing device 500 can be combined with other components in a mobile device (not shown), such as device 550. Each of such devices can contain one or more of computing device 500, 550, and an entire system can be made up of multiple computing devices 500, 550 communicating with each other.

Computing device 550 includes processor 552, memory 564, an input/output device such as display 554, communication interface 566, and transceiver 568, among other components. Device 550 also can be provided with a storage device, such as a microdrive or other device, to provide additional storage. Each of components 550, 552, 564, 554, 566, and 568, are interconnected using various buses, and several of the components can be mounted on a common motherboard or in other manners as appropriate.

Processor 552 can execute instructions within computing device 550, including instructions stored in memory 564. The processor can be implemented as a chipset of chips that include separate and multiple analog and digital processors. The processor can provide, for example, for coordination of the other components of device 550, such as control of user interfaces, applications run by device 550, and wireless communication by device 550.

Processor 552 can communicate with a user through control interface 558 and display interface 556 coupled to display 554. Display 554 can be, for example, a TFT LCD (Thin-Film-Transistor Liquid Crystal Display) or an OLED (Organic Light Emitting Diode) display, or other appropriate display technology. Display interface 556 can comprise appropriate circuitry for driving display 554 to present graphical and other data to a user. Control interface 558 can receive commands from a user and convert them for submission to processor 552. In addition, external interface 562 can communicate with processor 542, so as to enable near area communication of device 550 with other devices. External interface 562 can provide, for example, for wired communication in some implementations, or for wireless communication in other implementations, and multiple interfaces also can be used.

Memory 564 stores data within computing device 550. Memory 564 can be implemented as one or more of a computer-readable medium or media, a volatile memory unit or units, or a non-volatile memory unit or units. Expansion memory 574 also can be provided and connected to device 550 through expansion interface 572, which can include, for example, a SIMM (Single In Line Memory Module) card interface. Such expansion memory 574 can provide extra storage space for device 550, or also can store applications or other data for device 550. Specifically, expansion memory 574 can include instructions to carry out or supplement the processes described above, and can include secure data also. Thus, for example, expansion memory 574 can be provide as a security module for device 550, and can be programmed with instructions that permit secure use of device 550. In addition, secure applications can be provided via the SIMM cards, along with additional data, such as placing identifying data on the SIMM card in a non-hackable manner.

The memory can include, for example, flash memory and/or NVRAM memory, as discussed below. In one implementation, a computer program product is tangibly embodied in an data carrier. The computer program product contains instructions that, when executed, perform one or more methods, such as those described above. The data carrier is a computer- or machine-readable medium, such as memory 564, expansion memory 574, and/or memory on processor 552, that can be received, for example, over transceiver 568 or external interface 562.

Device 550 can communicate wirelessly through communication interface 566, which can include digital signal processing circuitry where necessary. Communication interface 566 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 568. In addition, short-range communication can occur, such as using a Bluetooth®, WiFi, or other such transceiver (not shown). In addition, GPS (Global Positioning System) receiver module 570 can provide additional navigation- and location-related wireless data to device 550, which can be used as appropriate by applications running on device 550.

Device 550 also can communicate audibly using audio codec 560, which can receive spoken data from a user and convert it to usable digital data. Audio codec 560 can likewise generate audible sound for a user, such as through a speaker, e.g., in a handset of device 550. Such sound can include sound from voice telephone calls, can include recorded sound (e.g., voice messages, music files, and the like) and also can include sound generated by applications operating on device 550.

Computing device 550 can be implemented in a number of different forms, as shown in the figure. For example, it can be implemented as cellular telephone 580. It also can be implemented as part of smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the processes and techniques described herein. A number of implementations have been described. Nevertheless, it will be understood that various modifications can be made without departing from the spirit and scope of the processes and techniques described herein.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:
1. A method performed by one or more hardware processing devices, comprising:
    receiving a request to generate a computer program that reads data from a first resource, performs one or more operations on the read data, and writes data resulting from the performance of the one or more operations to a second resource, wherein the first resource is different than the second resource;

generating, in response to receiving the request, data for a first user interface that when rendered on a display device renders:
   one or more first visual representations of one or more first fields of the first resource; and
   one or more second visual representations of one or more second fields of the second resource;

receiving data indicative of a selection of:
   at least one of the one or more first visual representations; and
   at least one of the one or more second visual representations;

determining, based on the selection of the at least one of the one or more first visual representations, at least one of the one or more first fields of the first resource from which data is read;

determining, based on the selection of the at least one of the one or more second visual representations, at least one of the one or more second fields of the second resource to which the data is written;

generating the computer program comprising:
   one or more first instructions to read the data from the at least one of the one or more first fields of the first resource; and
   one or more second instructions to write the data resulting from the performance of the one or more operations to the at least one of the one or more second fields of the second resource;

generating data for a second user interface that when rendered on the display device renders:
   a third visual representation of the computer program, with a portion of the third visual representation for input of the one or more operations, wherein the first user interface is different than the second user interface;

receiving data specifying the one or more operations; and updating, based on the received data, the computer program with one or more third instructions to perform the one or more operations.

2. The method of claim 1, further comprising:
accessing, in response to the request, the first resource and the second resource.

3. The method of claim 1, further comprising:
transmitting, to a computing device that sent the data indicative of the selection, the data for the second user interface.

4. The method of claim 1, further comprising:
accessing a mapping of visual representations to fields of resources;
wherein determining the at least one of the one or more first fields of the first resource comprises:
   determining, in the mapping, one or more correspondences among the at least one of the one or more first visual representations and the at least one of the one or more first fields of the first resource;
wherein determining the at least one of the one or more second fields of the second resource comprises:
   determining, in the mapping, one or more correspondences among the at least one of the one or more second visual representations and the at least one of the one or more second fields of the second resource.

5. The method of claim 1, further comprising:
reading the data from the at least one of the one or more first fields of the first resource;
performing the one or more operations on the data read from the at least one of the one or more first fields of the first resource; and
writing the data resulting from the performance of the one or more operations to the at least one of the one or more second fields of the second resource.

6. The method of claim 1, wherein one or more of the first resource and the second resource comprises one or more of a data structure, a web page, a form, and a web site.

7. One or more machine-readable hardware storage devices storing instructions that are executable by one or more hardware processing devices to perform operations comprising:
receiving a request to generate a computer program that reads data from a first resource, performs one or more operations on the read data, and writes data resulting from the performance of the one or more operations to a second resource, wherein the first resource is different than the second resource;

generating, in response to receiving the request, data for a first user interface that when rendered on a display device renders:
   one or more first visual representations of one or more first fields of the first resource; and
   one or more second visual representations of one or more second fields of the second resource;

receiving data indicative of a selection of:
   at least one of the one or more first visual representations; and
   at least one of the one or more second visual representations;

determining, based on the selection of the at least one of the one or more first visual representations, at least one of the one or more first fields of the first resource from which data is read;

determining, based on the selection of the at least one of the one or more second visual representations, at least one of the one or more second fields of the second resource to which the data is written;

generating the computer program comprising:
   one or more first instructions to read the data from the at least one of the one or more first fields of the first resource; and
   one or more second instructions to write the data resulting from the performance of the one or more operations to the at least one of the one or more second fields of the second resource;

generating data for a second user interface that when rendered on the display device renders:
   a third visual representation of the computer program, with a portion of the third visual representation for input of the one or more operations, wherein the first user interface is different than the second user interface;

receiving data specifying the one or more operations; and updating, based on the received data, the computer program with one or more third instructions to perform the one or more operations.

8. The one or more machine-readable hardware storage devices of claim 7, wherein the operations further comprise:
accessing, in response to the request, the first resource and the second resource.

9. The one or more machine-readable hardware storage devices of claim 7, wherein the operations further comprise:
transmitting, to a computing device that sent the data indicative of the selection, the data for the second user interface.

10. The one or more machine-readable hardware storage devices of claim 7, wherein the operations further comprise:
   accessing a mapping of visual representations to fields of resources;
   wherein determining the at least one of the one or more first fields of the first resource comprises:
      determining, in the mapping, one or more correspondences among the at least one of the one or more first visual representations and the at least one of the one or more first fields of the first resource;
   wherein determining the at least one of the one or more second fields of the second resource comprises:
      determining, in the mapping, one or more correspondences among the at least one of the one or more second visual representations and the at least one of the one or more second fields of the second resource.

11. The one or more machine-readable hardware storage devices of claim 7, wherein the operations further comprise:
   reading the data from the at least one of the one or more first fields of the first resource;
   performing the one or more operations on the data read from the at least one of the one or more first fields of the first resource; and
   writing the data resulting from the performance of the one or more operations to the at least one of the one or more second fields of the second resource.

12. The one or more machine-readable hardware storage devices of claim 7, wherein one or more of the first resource and the second resource comprises one or more of a data structure, a web page, a form, and a web site.

13. An electronic system comprising:
   one or more hardware processing devices; and
   one or more machine-readable hardware storage devices storing instructions that are executable by the one or more hardware processing devices to perform operations comprising:
      receiving a request to generate a computer program that reads data from a first resource, performs one or more operations on the read data, and writes data resulting from the performance of the one or more operations to a second resource, wherein the first resource is different than the second resource;
      generating, in response to receiving the request, data for a first user interface that when rendered on a display device renders:
         one or more first visual representations of one or more first fields of the first resource; and
         one or more second visual representations of one or more second fields of the second resource;
      receiving data indicative of a selection of:
         at least one of the one or more first visual representations; and
         at least one of the one or more second visual representations;
      determining, based on the selection of the at least one of the one or more first visual representations, at least one of the one or more first fields of the first resource from which data is read;
      determining, based on the selection of the at least one of the one or more second visual representations, at least one of the one or more second fields of the second resource to which the data is written;
      generating the computer program comprising:
         one or more first instructions to read the data from the at least one of the one or more first fields of the first resource; and
         one or more second instructions to write the data resulting from the performance of the one or more operations to the at least one of the one or more second fields of the second resource;
      generating data for a second user interface that when rendered on the display device renders:
         a third visual representation of the computer program, with a portion of the third visual representation for input of the one or more operations, wherein the first user interface is different than the second user interface;
      receiving data specifying the one or more operations; and
      updating, based on the received data, the computer program with one or more third instructions to perform the one or more operations.

14. The electronic system of claim 13, wherein the operations further comprise:
   accessing a mapping of visual representations to fields of resources;
   wherein determining the at least one of the one or more first fields of the first resource comprises:
      determining, in the mapping, one or more correspondences among the at least one of the one or more first visual representations and the at least one of the one or more first fields of the first resource;
   wherein determining the at least one of the one or more second fields of the second resource comprises:
      determining, in the mapping, one or more correspondences among the at least one of the one or more second visual representations and the at least one of the one or more second fields of the second resource.

15. The electronic system of claim 13, wherein the operations further comprise:
   reading the data from the at least one of the one or more first fields of the first resource;
   performing the one or more operations on the data read from the at least one of the one or more first fields of the first resource; and
   writing the data resulting from the performance of the one or more operations to the at least one of the one or more second fields of the second resource.

16. The electronic system of claim 13, wherein one or more of the first resource and the second resource comprises one or more of a data structure, a web page, a form, and a web site.

17. An electronic system comprising:
   means for receiving a request to generate a computer program that reads data from a first resource, performs one or more operations on the read data, and writes data resulting from the performance of the one or more operations to a second resource, wherein the first resource is different than the second resource;
   means for generating, in response to receiving the request, data for a first user interface that when rendered on a display device renders:
      one or more first visual representations of one or more first fields of the first resource; and
      one or more second visual representations of one or more second fields of the second resource;
   means for receiving data indicative of a selection of:
      at least one of the one or more first visual representations; and
      at least one of the one or more second visual representations;
   means for determining, based on the selection of the at least one of the one or more first visual representations, at least one of the one or more first fields of the first resource from which data is read;

means for determining, based on the selection of the at least one of the one or more second visual representations, at least one of the one or more second fields of the second resource to which the data is written;

means for generating the computer program comprising:
  one or more first instructions to read the data from the at least one of the one or more first fields of the first resource; and
  one or more second instructions to write the data resulting from the performance of the one or more operations to the at least one of the one or more second fields of the second resource;

means for generating data for a second user interface that when rendered on the display device renders:
  a third visual representation of the computer program, with a portion of the third visual representation for input of the one or more operations, wherein the first user interface is different than the second user interface;

means for receiving data specifying the one or more operations; and means for updating, based on the received data, the computer program with one or more third instructions to perform the one or more operations.

* * * * *